United States Patent
Tosa et al.

(10) Patent No.: US 11,373,533 B2
(45) Date of Patent: Jun. 28, 2022

(54) VEHICLE CONTROL APPARATUS

(71) Applicants: DENSO CORPORATION, Kariya (JP); TOYOTA JIDOSHA KABUSHIKI KAISHA, Toyota (JP)

(72) Inventors: Takatoshi Tosa, Kariya (JP); Yohei Masui, Kariya (JP); Takashi Maeda, Nagoya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 398 days.

(21) Appl. No.: 16/463,083

(22) PCT Filed: Nov. 16, 2017

(86) PCT No.: PCT/JP2017/041262
§ 371 (c)(1),
(2) Date: May 22, 2019

(87) PCT Pub. No.: WO2018/097026
PCT Pub. Date: May 31, 2018

(65) Prior Publication Data
US 2019/0295419 A1 Sep. 26, 2019

(30) Foreign Application Priority Data
Nov. 25, 2016 (JP) .............................. JP2016-229229

(51) Int. Cl.
*G08G 1/16* (2006.01)
*B62D 6/00* (2006.01)
(Continued)

(52) U.S. Cl.
CPC ............. *G08G 1/166* (2013.01); *B60W 30/10* (2013.01); *B62D 6/00* (2013.01); *B62D 6/001* (2013.01);
(Continued)

(58) Field of Classification Search
None
See application file for complete search history.

(56) References Cited

U.S. PATENT DOCUMENTS

| 5,710,565 A * | 1/1998 | Shirai | B60K 31/0008 342/70 |
| 5,986,601 A * | 11/1999 | Sugimoto | G01S 7/415 342/70 |

(Continued)

FOREIGN PATENT DOCUMENTS

| JP | WO2016088462 | * 10/2015 | ............... G08G 1/00 |
| JP | 2016-101889 A | 6/2016 | |

(Continued)

OTHER PUBLICATIONS

U.S. Appl. No. 14/883,633, filed Oct. 15, 2015 or U.S. Pat. No. 9805592; hereinafter Ibrahim (Year: 2015).*

*Primary Examiner* — Kevin P Mahne
*Assistant Examiner* — Tischi Balachandra
(74) *Attorney, Agent, or Firm* — Maschoff Brennan (57) ABSTRACT

A vehicle control apparatus acquires a position of an other vehicle that is present ahead of the own vehicle in its traveling direction, and uses the acquired position of the other vehicle to calculate a movement locus, which is a past path of the other vehicle. The vehicle control device calculates a lateral movement amount of the movement locus in a predetermined range in the traveling direction of the own vehicle, the lateral movement amount being an amount of change in position in a lateral direction which is a direction intersecting the traveling direction, and calculates an average value of the lateral movement amounts. The vehicle control apparatus excludes, from the movement loci, a movement locus having a lateral movement amount whose (Continued)

difference from the average value is larger than a predetermined value, and calculates the predicted path based on remaining movement loci.

13 Claims, 8 Drawing Sheets

(51) Int. Cl.
| | | |
|---|---|---|
| *G05D 1/02* | (2020.01) | |
| *G08G 1/01* | (2006.01) | |
| *G08G 1/048* | (2006.01) | |
| *G08G 1/052* | (2006.01) | |
| *B60W 30/10* | (2006.01) | |
| *G08G 1/09* | (2006.01) | |

(52) U.S. Cl.
CPC .......... *G05D 1/0214* (2013.01); *G08G 1/0108* (2013.01); *G08G 1/048* (2013.01); *G08G 1/052* (2013.01); *G08G 1/09* (2013.01); *G08G 1/16* (2013.01); *G08G 1/161* (2013.01); *G08G 1/167* (2013.01); *G05D 2201/0213* (2013.01)

(56) References Cited

U.S. PATENT DOCUMENTS

| | | | | |
|---|---|---|---|---|
| 6,188,950 | B1 * | 2/2001 | Tsutsumi | B60K 31/0008 701/96 |
| 6,269,307 | B1 * | 7/2001 | Shinmura | B62D 15/0265 701/301 |
| 6,396,165 | B1 | 5/2002 | Nagano et al. | |
| 6,775,605 | B2 * | 8/2004 | Rao | B60R 21/013 701/45 |
| 7,034,742 | B2 * | 4/2006 | Cong | G01S 13/931 342/70 |
| 7,162,361 | B2 * | 1/2007 | Heinrichs-Bartscher | B60K 31/0008 180/170 |
| 7,212,907 | B2 * | 5/2007 | Heinrichs-Bartscher | B60K 31/0008 701/96 |
| 7,248,962 | B2 * | 7/2007 | Heinrichs-Bartscher | B60K 31/0008 701/117 |
| 7,386,385 | B2 * | 6/2008 | Heinrichs-Bartscher | B60W 30/16 701/93 |
| 7,426,450 | B2 * | 9/2008 | Arnold | G01S 13/583 702/142 |
| 7,522,091 | B2 * | 4/2009 | Cong | G01S 13/723 342/70 |
| 7,774,123 | B2 * | 8/2010 | Schroder | B60W 30/16 701/96 |
| 7,831,367 | B2 * | 11/2010 | Heinrichs-Bartscher | B60W 30/16 701/96 |
| 7,840,330 | B2 * | 11/2010 | Heinrichs-Bartscher | B60W 30/16 701/96 |
| 8,311,730 | B2 * | 11/2012 | Neff | B60W 40/02 701/300 |
| 8,532,862 | B2 * | 9/2013 | Neff | G05D 1/0246 701/25 |
| 9,110,164 | B2 * | 8/2015 | Moriuchi | G01S 13/931 |
| 9,387,857 | B2 * | 7/2016 | Fairgrieve | B60W 30/16 |
| 9,540,003 | B2 * | 1/2017 | Yamakado | B60W 10/06 |
| 9,805,592 | B2 * | 10/2017 | Ibrahim | G08G 1/0112 |
| 10,317,902 | B2 * | 6/2019 | Nilsson | G05D 1/0214 |
| 10,407,047 | B2 * | 9/2019 | Johnson | B60W 10/18 |
| 10,435,019 | B2 * | 10/2019 | Ueda | B60W 30/0953 |
| 11,036,238 | B2 * | 6/2021 | Nobukawa | G08G 1/164 |
| 2011/0222732 | A1 * | 9/2011 | Higuchi | B60W 30/18145 382/104 |
| 2012/0185167 | A1 * | 7/2012 | Higuchi | G06T 7/70 701/461 |
| 2012/0277965 | A1 * | 11/2012 | Takahashi | B60W 30/143 701/70 |
| 2014/0092237 | A1 * | 4/2014 | Watanabe | G06K 9/00798 348/118 |
| 2016/0107682 | A1 * | 4/2016 | Tan | B62D 6/00 701/41 |
| 2016/0339914 | A1 | 11/2016 | Habu et al. | |
| 2017/0031361 | A1 * | 2/2017 | Olson | G08G 1/167 |
| 2017/0326981 | A1 * | 11/2017 | Masui | G08G 1/167 |
| 2017/0327118 | A1 * | 11/2017 | Masui | B60W 40/072 |
| 2018/0045832 | A1 * | 2/2018 | Ibrahim | G08G 1/167 |
| 2018/0150086 | A1 * | 5/2018 | Nobukawa | G01C 21/12 |
| 2018/0253103 | A1 * | 9/2018 | Winkler | G05D 1/0088 |
| 2018/0257660 | A1 * | 9/2018 | Ibrahim | H04L 67/12 |
| 2019/0100199 | A1 * | 4/2019 | Ueda | B60W 30/0953 |
| 2019/0227560 | A1 * | 7/2019 | Ueda | G05D 1/0088 |

FOREIGN PATENT DOCUMENTS

| | | |
|---|---|---|
| JP | 2016-103224 A | 6/2016 |
| JP | 2016-215761 A | 7/2016 |
| WO | 2016/084479 A1 | 6/2016 |

\* cited by examiner

VEHICLE CONTROL APPARATUS

CROSS-REFERENCE TO RELATED APPLICATIONS

This application is a national stage application of PCT Application No. PCT/JP2017/041262, filed on Nov. 16, 2017, which claims priority to Japanese Patent Application No. 2016-229229 filed on Nov. 25, 2016, the contents of which are incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a vehicle control apparatus for controlling travelling of an own vehicle on the basis of a predicted path of the own vehicle.

BACKGROUND ART

Conventionally, a predicted path, which is a future path of the own vehicle, is obtained, and the own vehicle is controlled so as to travel along the predicted path. When the control is performed, if an other vehicle is present ahead of the own vehicle in its traveling direction, the position of the other vehicle is detected and a movement locus of the other vehicle is obtained, and on the basis of the movement locus, a predicted path of the own vehicle is obtained.

Apparatuses that obtain a predicted path of the own vehicle on the basis of a movement locus of an other vehicle in this manner include a vehicle control apparatus described in Patent Literature 1. In the vehicle control apparatus described in Patent Literature 1, the shape of a road is obtained on the basis of a travel lane line drawn on the road or a structure such as a side wall provided on the roadside, and a predicted path of the own vehicle is calculated by using a movement locus along the shape of the road.

CITATION LIST

Patent Literature

[PTL 1] JP 2016-101889 A

SUMMARY OF THE INVENTION

In the vehicle control apparatus described in Patent Literature 1, when no travel lane line, no structure, or the like can be detected, for example, when no travel lane line is drawn on the road, or when no structure such as a side wall is provided on the roadside, the road shape cannot be obtained on the basis of a travel lane line on the road or a structure on the roadside. Furthermore, when a travel lane line drawn on the road is blurred, in bad weather, or the like, detection of the travel lane line is difficult, and this makes it difficult to obtain the road shape. Specifically, it may be impossible to determine whether a movement locus of an other vehicle is effective or ineffective.

The present disclosure has been made to solve the above problems, and has a main object of providing a travel support apparatus capable of appropriately obtaining a predicted path of an own vehicle even when detection of a road shape is difficult.

The present disclosure is a vehicle control apparatus for controlling traveling of an own vehicle on the basis of a predicted path which is a future travel path of the own vehicle, including: a position acquisition section that acquires a position of an other vehicle that is present ahead of the own vehicle in its traveling direction; a locus calculation section that calculates a movement locus, which is a past path of the other vehicle, by using the position of the other vehicle acquired by the position acquisition section; a lateral movement amount calculation section that calculates a lateral movement amount of the movement locus in a predetermined range in the traveling direction of the own vehicle, the lateral movement amount being an amount of change in position in a lateral direction which is a direction intersecting the traveling direction; an average value calculation section that calculates an average value of a plurality of lateral movement amounts; and a path calculation section that excludes, from a plurality of movement loci, a movement locus having a lateral movement amount whose difference from the average value is larger than a predetermined value, and then calculates the predicted path on the basis of one or more remaining movement loci.

When a plurality of other vehicles travel along a road shape, lateral movement amounts of movement loci of the other vehicles are approximately equal to each other. However, when a vehicle that has made a lane change or the like is present, the amount of change in lateral position of the vehicle deviates from an average value. With the above configuration, when the predicted path of the own vehicle is calculated from a movement locus of an other vehicle, a movement locus of an other vehicle that has made a movement not along the road shape can be appropriately excluded. Thus, even when detection of a travel lane line is difficult, the movement locus of the own vehicle can be obtained on the basis of the appropriate movement locus.

BRIEF DESCRIPTION OF THE DRAWINGS

The above object and other objects, features, and advantages of the present disclosure will be further clarified by the following detailed description with reference to the accompanying drawings, wherein.

DESCRIPTION OF THE EMBODIMENTS

Embodiments will be described below with reference to the drawings. In the following embodiments, the same or equivalent portions are given the same reference numerals in the drawings, and descriptions of the portions given the same reference numerals are incorporated by reference.

First Embodiment

Figure 1:
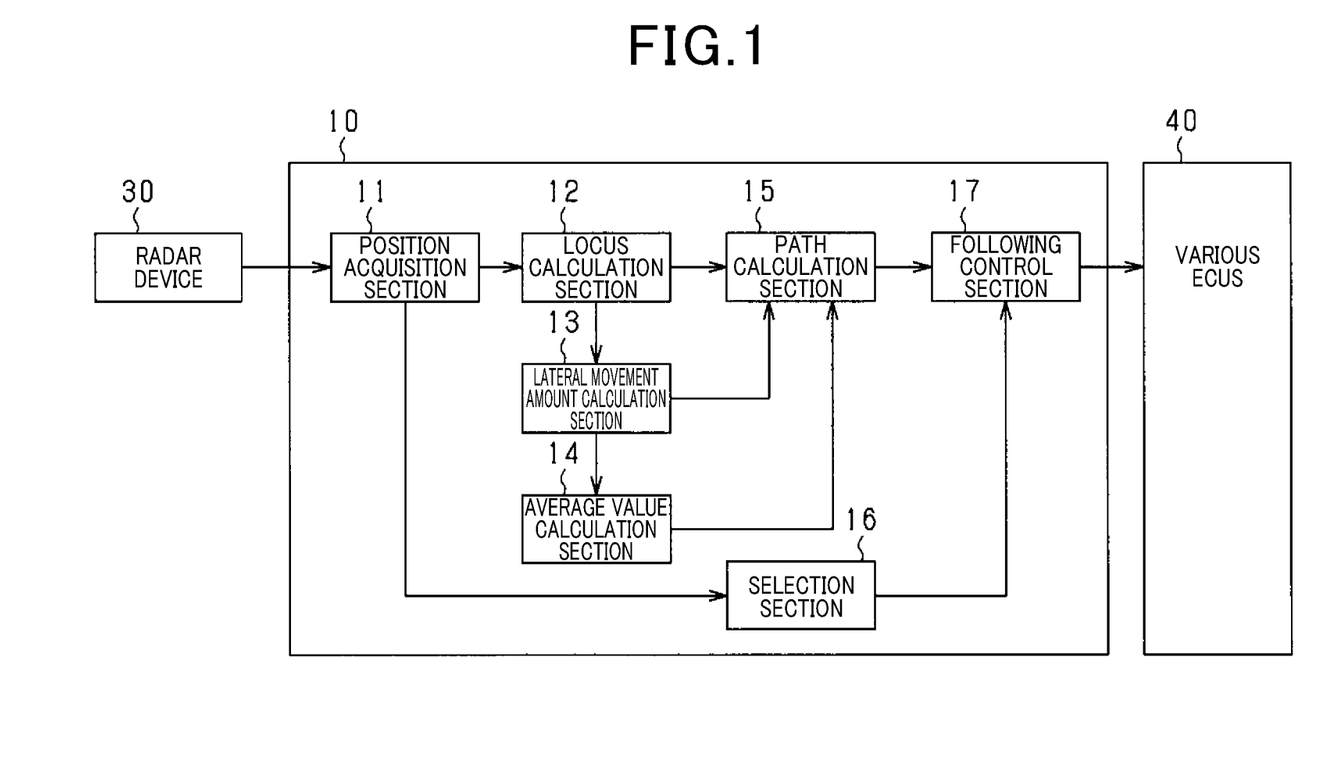
FIG. 1 is a view illustrating a configuration of a vehicle control apparatus.

A vehicle control system according to the present embodiment is mounted in a vehicle (own vehicle), and includes a vehicle control apparatus 10, a radar device 30, and various ECUs 40. The vehicle control apparatus 10 is a computer including a CPU, a ROM, a RAM, an I/O, and the like. The CPU executes programs installed in the ROM, so that various functions are performed. The various ECUs include an engine ECU that controls an engine, a brake ECU that controls a brake device, and a steering ECU that controls a steering device.

The own vehicle is provided with an object detection device that detects an object that is present around the vehicle. Information on the object detection is inputted from the object detection device to the vehicle control apparatus 10. On the basis of the inputted information, the vehicle control apparatus 10 performs various controls. Specifically, as the object detection apparatus, the radar device 30 is provided.

The radar device 30 detects an object by transmitting a radio wave as a transmission wave and receiving a reflected wave of the radio wave. Specifically, the present embodiment employs a millimeter wave radar that transmits a millimeter wave as a radio wave. The radar device 30 is mounted at a front portion of the own vehicle, and scans a region extending with respect to the center axis over a predetermined angle range toward an area ahead of the vehicle. The radar device 30 generates distance measurement data on the basis of time between when the radar device 30 transmits a radio wave toward the area ahead of the vehicle and when the radar device 30 receives a reflected wave. The radar device 30 sequentially outputs the generated distance measurement data to the vehicle control apparatus 10. The distance measurement data includes information on an azimuth in which the object is present and a distance and a relative speed to the object. The distance measurement data may include intensity of the reflected wave.

A position acquisition section 11 acquires, from the radar device 30, the distance measurement data, i.e., data indicating a relative position between the own vehicle and an other vehicle. Then, at a predetermined cycle, the position acquisition section 11 calculates an other vehicle position, which is coordinates indicating a passing point of the other vehicle. Specifically, the position acquisition section 11 updates the relative position of the other vehicle by using a speed and a yaw rate of the own vehicle. The position acquisition section 11 then stores the calculated other vehicle positions in chronological order.

A locus calculation section 12 calculates a movement locus of a preceding vehicle on the basis of the chronological data on the other vehicle positions acquired from the position acquisition section 11. Specifically, the locus calculation section 12 obtains an approximate curve that chronologically passes through the other vehicle positions, and determines that the approximate curve is a movement locus of the other vehicle.

When the movement locus of the other vehicle is calculated in this manner, a predicted path of the own vehicle is obtained on the basis of the movement locus. Then, steering control and acceleration or deceleration control are performed so that the own vehicle travels along the predicted path. However, when the movement locus to be used to obtain the predicted path of the own vehicle is not along a road shape, the predicted path of the own vehicle may not be along the road shape. According to the present embodiment, therefore, a process is performed in which, from the movement loci of the other vehicles, a movement locus that is unlikely to be along the road shape is excluded from the calculation of the predicted path of the own vehicle.

Figure 2:
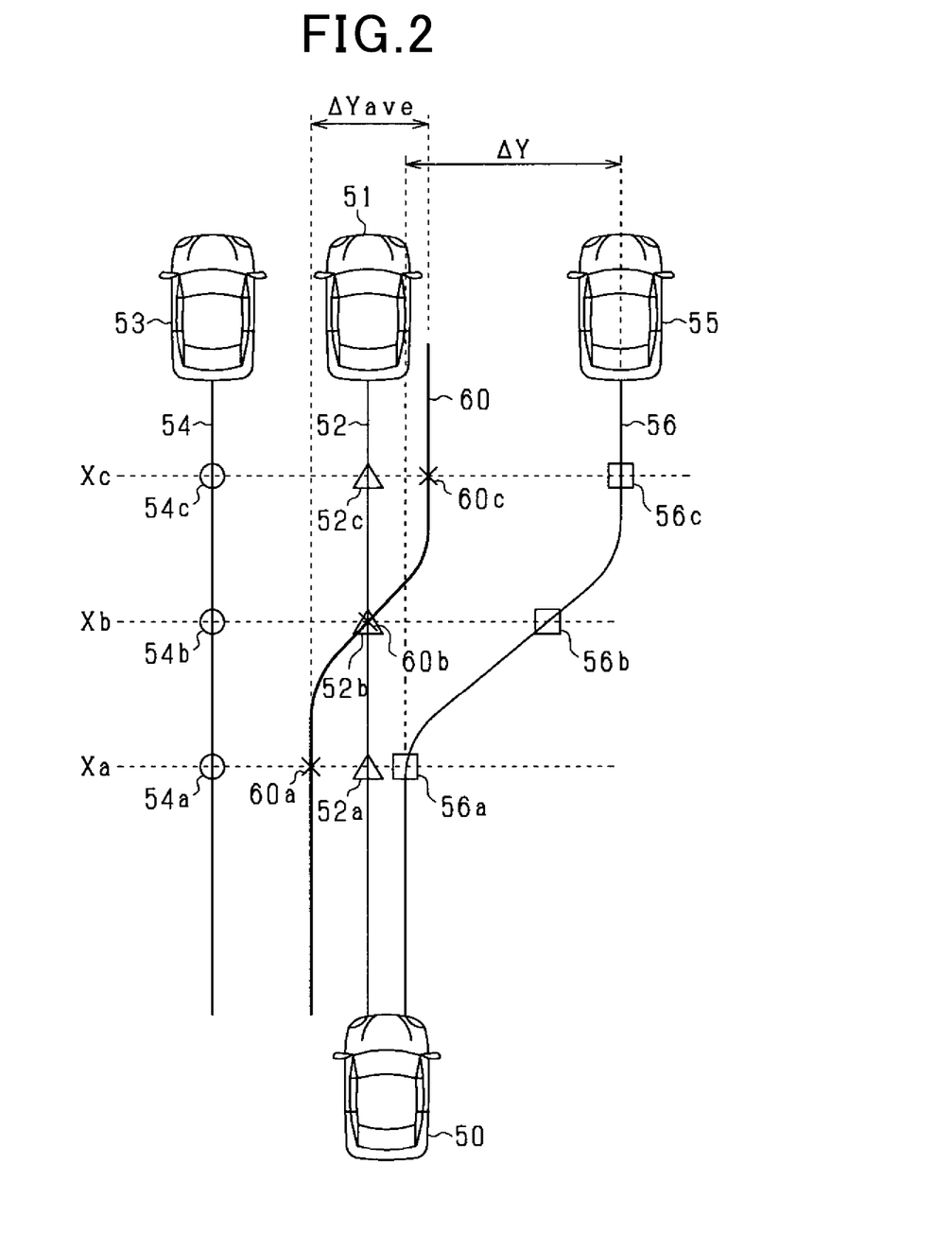
FIG. 2 is a view illustrating a relationship between a movement locus, a lateral movement amount, and an average value.

The process of excluding the movement locus will be described with reference to FIG. 2. FIG. 2 illustrates an example in which three other vehicles are present ahead of an own vehicle 50 in its traveling direction. In FIG. 2, a first vehicle 51 indicates an other vehicle that is closest to the own vehicle 50 in position in a lateral direction, which is a direction orthogonal to the traveling direction, a second vehicle 53 indicates an other vehicle that is traveling on a left side of the first vehicle 51, and a third vehicle 55 indicates an other vehicle that is traveling on a right side of the first vehicle. The first vehicle 51 and the second vehicle 53 are assumed to have been traveling straight. The third vehicle 55 is assumed to have been traveling between the own vehicle 50 and the first vehicle 51 and then made a lane change to move to the right side of the first vehicle 51.

In this case, an average locus 60 is obtained by averaging a movement locus 52 of the first vehicle 51, a movement locus 54 of the second vehicle 53, and a movement locus 56 of the third vehicle 55.

Among the movement loci 52, 54, and 56, the movement locus 52 and the movement locus 54 of the first vehicle 51 and the second vehicle 53 which are moving along a road shape are appropriate for calculation of the predicted path of the own vehicle 50. On the other hand, the movement locus 56 of the third vehicle 55 which has made a lane change is not along the road shape, and thus needs to be excluded from the calculation of the predicted path of the own vehicle 50.

Thus, for each of the movement locus 52 of the first vehicle 51, the movement locus 54 of the second vehicle 53, and the movement locus 56 of the third vehicle 55, a lateral movement amount calculation section 13 calculates a lateral movement amount $\Delta Y$, which is a movement amount in the lateral direction. When the lateral movement amounts $\Delta Y$ of the movement loci 52, 54, and 56 are obtained, an average value calculation section 14 calculates an average value $\Delta Yave$ of the lateral movement amounts $\Delta Y$, and obtains a deviation of each of the lateral movement amounts $\Delta Y$ from the average value $\Delta Yave$. This is because when a plurality of other vehicles traveling along the road shape are present ahead of the own vehicle 50 in its traveling direction, lateral movement amounts $\Delta Y$ of the other vehicles are approximately equal to each other, and a lateral movement amount $\Delta Y$ of an other vehicle that has not traveled along the road shape deviates from the average value $\Delta Yave$.

Thus, when obtaining the lateral movement amount $\Delta Y$, the lateral movement amount calculation section 13 obtains lateral movement amounts $\Delta Y$ in a range in which a longitudinal position is the same. The longitudinal position is a position in a longitudinal direction which is a direction orthogonal to the lateral direction, i.e., in the traveling direction. Specifically, in FIG. 2, lateral movement amounts $\Delta Y$ between a longitudinal position Xa and a longitudinal position Xb, lateral movement amounts $\Delta Y$ between the longitudinal position Xb and a longitudinal position Xc, or lateral movement amounts $\Delta Y$ between the longitudinal position Xa and the longitudinal position Xc are obtained. More specifically, lateral movement amounts $\Delta Y$ between the longitudinal position Xa and the longitudinal position Xc are obtained. The longitudinal positions Xa, Xb, and Xc are sufficiently spaced from each other to detect a position of the other vehicle multiple times. This is because, even when a position which is a noise is detected due to erroneous detection or the like during the detection of positions, by using a plurality of detection points, an influence of the noise can be reduced.

The lateral movement amount $\Delta Y$ of the first vehicle 51 is obtained by subtracting a lateral position 52a from a lateral position 52c, the lateral movement amount $\Delta Y$ of the second vehicle 53 is obtained by subtracting a lateral position 54a from a lateral position 54c, and the lateral movement amount $\Delta Y$ of the third vehicle 55 is obtained by subtracting a lateral position 56a from a lateral position 56c. In FIG. 2, since the first vehicle 51 and the second vehicle 53 are assumed to be traveling straight, the lateral movement amounts $\Delta Y$ of the first vehicle 51 and the second vehicle 53 are approximately zero. Thus, the lateral movement amounts $\Delta Y$ of the first vehicle 51 and the second vehicle 53 are omitted in FIG. 2.

When the lateral movement amounts $\Delta Y$ are obtained in this manner, the average value $\Delta Y$ave of the lateral movement amounts $\Delta Y$ are obtained. As illustrated in FIG. 2, the average value $\Delta Y$ave is equal to a difference between a lateral position 60a and a lateral position 60c on the average locus 60, which is the average of the movement loci 52, 54, and 56.

When the lateral movement amount $\Delta Y$ and the average value $\Delta Y$ave are obtained as described above, the lateral movement amount $\Delta Y$ and the average value $\Delta Y$ave are inputted to a path calculation section 15. The path calculation section 15 calculates a difference between the lateral movement amount $\Delta Y$ and the average value $\Delta Y$ave. When an absolute value of the difference is larger than a predetermined value, the path calculation section 15 determines that the lateral movement amount $\Delta Y$ of the movement locus deviates from the average value $\Delta Y$ave, and excludes the movement locus from the movement loci to be used to calculate the predicted path. For example, the predetermined value used for the comparison with the absolute value of the difference is defined so that when a plurality of vehicles have been traveling straight and a vehicle has made a lane change, the lane change is determinable. The predetermined value may be set to be variable depending on the number of movement loci or a width of the lane.

From the movement loci remaining after the above-described exclusion process is performed, the path calculation section 15 selects a movement locus to be used to calculate the predicted path of the own vehicle. Specifically, from the other vehicles whose movement locus has not been excluded, the path calculation section 15 selects an other vehicle closest to the own vehicle in the lateral position, and determines a movement locus of the other vehicle as the predicted path of the own vehicle. Specifically, the path calculation section 15 calculates the predicted path as a path along the movement locus while maintaining the difference between the lateral position of the own vehicle and the lateral position of the movement locus.

On the other hand, the detection result on the other vehicle is also inputted to a selection section 16. The selection section 16 selects an other vehicle to be a following target from the vehicles that are present ahead of the own vehicle in its traveling direction. In this process performed by the selection section 16, for example, a vehicle closest to the own vehicle in the lateral position is selected as the following target. Then, the selection result is inputted to a following control section 17.

The following control section 17 transmits instructions to the engine ECU and the brake ECU included in the various ECUs 40 to maintain a distance to the other vehicle selected as the following target. Furthermore, the following control section 17 transmits instructions to the steering ECU included in the various ECUs 40 to prevent the position of the own vehicle in the lateral direction from deviating from the predicted path calculated by the path calculation section 15.

Since the following control is performed in this manner, when the predicted path is calculated, the movement locus of the other vehicle selected as the following target may be preferentially selected. Specifically, when the movement locus of the other vehicle selected as the following target has not been excluded, the predicted path may be calculated by using the movement locus of the other vehicle selected as the following target.

Figure 3:
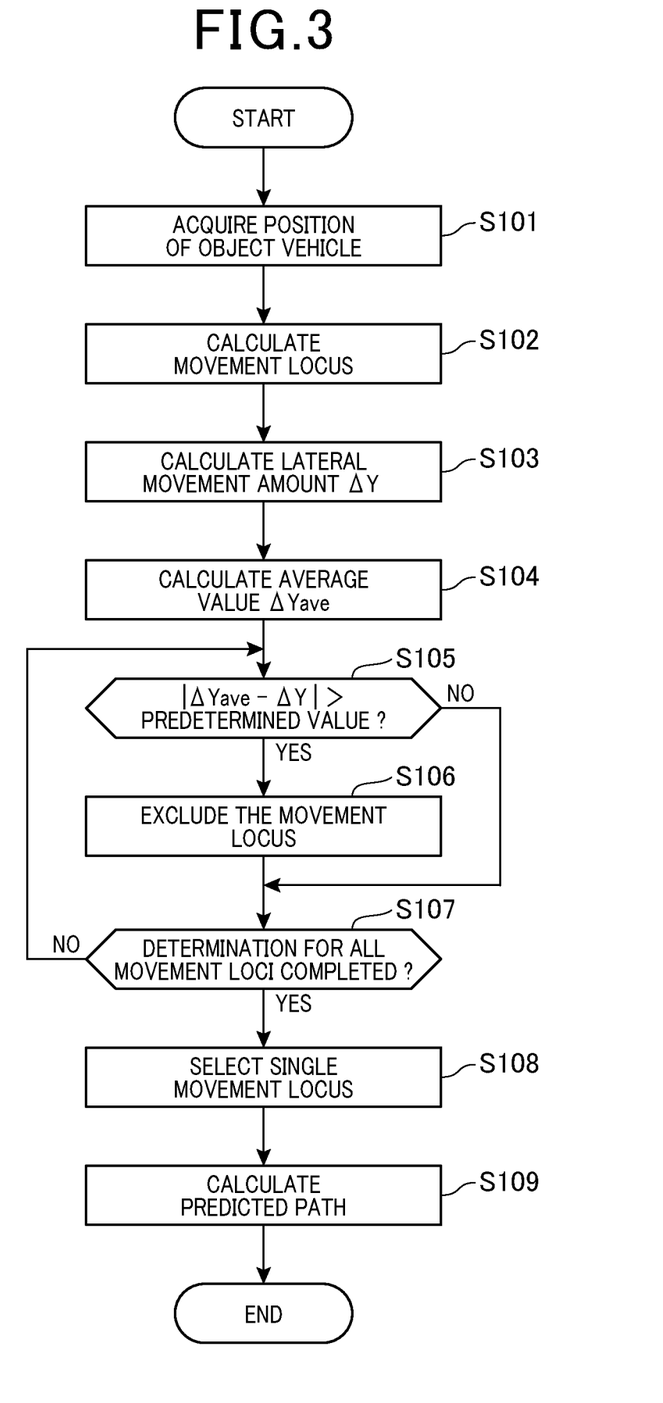
FIG. 3 is a flow chart showing a process according to a first embodiment.

A series of processes performed by the vehicle control apparatus 10 configured as described above will be described with reference to a flow chart in FIG. 3. The flow chart in FIG. 3 is repeatedly performed at a predetermined control cycle.

First, at step S101, a position of an other vehicle is acquired, and at subsequent step S102, a movement locus of the other vehicle is calculated. In the process at step S102, the movement locus is calculated for each other vehicle that is present ahead of the own vehicle in its traveling direction. Subsequently, the control proceeds to step S103, and a lateral movement amount $\Delta Y$ is calculated by using the movement locus calculated at step S102. In the process at step S103, the lateral movement amount $\Delta Y$ is calculated for each movement locus.

When the lateral movement amounts $\Delta Y$ of the respective movement loci are calculated, the control proceeds to step S104, and an average value $\Delta Y$ave of the lateral movement amounts $\Delta Y$ is calculated. Specifically, the average value $\Delta Y$ave is calculated by calculating a total value of the lateral movement amounts $\Delta Y$ calculated at step S103 and dividing the total value by the number of movement loci.

Subsequently, the control proceeds to step S105, and an absolute value of the difference between the lateral movement amount $\Delta Y$ of one of the movement loci and the average value $\Delta Y$ave is obtained, and it is determined whether the absolute value is larger than a predetermined value.

When an affirmative determination is made at step S105, i.e., when the absolute value of the difference between the lateral movement amount $\Delta Y$ and the average value $\Delta Y$ave is larger than the predetermined value, the control proceeds to step S106, and the movement locus is excluded from the movement loci to be selected. Then, the control proceeds to step S107. On the other hand, when a negative determination is made at step S105, the control directly proceeds to step S107.

At step S107, it is determined whether the determination at step S105 has been completed for all the movement loci. When a negative determination is made at step S107, i.e., when a movement locus for which the determination at step S105 has not been completed is present, the control returns to step S105. On the other hand, when an affirmative determination is made at step S107, i.e., when the determination at step S105 has been completed for all the movement loci, the control proceeds to step S108.

At step S108, from the movement loci that have not been excluded by the process at step S106, a movement locus to be used to calculate the predicted path is selected. In the process at step S108, as mentioned above, when an other vehicle to be a following target has been selected, a movement locus of the other vehicle may be preferentially selected. When no other vehicle to be a following target has been selected, a movement locus of an other vehicle closest to the own vehicle in the lateral position may be selected.

When the movement locus is selected at step S108, the control proceeds to step S109, and the predicted path of the own vehicle is calculated by using the selected movement locus. Then, the series of processes ends.

The above-described process of obtaining the lateral movement amount $\Delta Y$ and the average value $\Delta Y_{ave}$ and the difference between the lateral movement amount $\Delta Y$ and the average value $\Delta Y_{ave}$ may be performed at each cycle for all sections of the movement locus or only for sections other than sections for which the calculation has already been performed at the previous cycles. In the latter case, for a movement locus for which the absolute value of the difference between the lateral movement amount $\Delta Y$ and the average value $\Delta Y_{ave}$ is larger than the predetermined value and thus has been excluded, the determination that the movement locus is excluded is continued. Then, when the own vehicle has passed through a section at which the absolute value of the difference between the lateral movement amount $\Delta Y$ and the average value $\Delta Y_{ave}$ is larger than the predetermined value, the determination that the movement locus is excluded may be ended.

When the number of other vehicles traveling ahead of the own vehicle in its traveling direction is small, even if an other vehicle that has made a lane change is present, the difference between a lateral movement amount $\Delta Y$ of the other vehicle and an average value $\Delta Y_{ave}$ tends to be small. Specifically, it is difficult to determine whether to exclude a movement locus of the vehicle that has made a lane change. In particular, when the number of other vehicles traveling ahead of the own vehicle in its traveling direction is two, even if a deviation of the lateral movement amount from the average is obtained, the difference between a lateral movement amount $\Delta Y$ of an other vehicle traveling along the road shape and an average value $\Delta Y_{ave}$ is equal to the difference between a lateral movement amount $\Delta Y$ of an other vehicle that has made a lane change and the average value $\Delta Y_{ave}$.

In this regard, a lateral movement amount $\Delta Y$ of a vehicle that has made a lane change is generally larger than an average value $\Delta Y_{ave}$, except for the case where a lane change or a path change is made in a curve section of the road. Accordingly, from movement histories for which an absolute value of the difference between an average value $\Delta Y_{ave}$ and a lateral movement amount $\Delta Y$ is larger than a predetermined value, a movement history for which the lateral movement amount $\Delta Y$ is larger than the average value $\Delta Y_{ave}$ may be excluded. Thus, even when the number of other vehicles traveling ahead of the own vehicle in its traveling direction is small, the movement history that is unlikely to be along the road shape can be appropriately excluded.

With the above configuration, the vehicle control apparatus 10 according to the present embodiment provides the following effects.

When a plurality of other vehicles travel along a road, lateral movement amounts $\Delta Y$ of movement loci of the other vehicles are approximately equal to each other. However, when a vehicle that has made a lane change or the like is present, a lateral movement amount $\Delta Y$ of the vehicle deviates from an average value $\Delta Y_{ave}$. In the present embodiment, when the predicted path of the own vehicle is calculated from the movement locus of the other vehicle, the movement locus of the other vehicle that has made a movement not along the road shape can be appropriately excluded. Thus, even when detection of a travel lane line is difficult, the movement locus of the own vehicle can be obtained on the basis of the appropriate movement locus.

When a plurality of movement loci are used to calculate the predicted path of the own vehicle, the calculation may be complicated. In this regard, in the present embodiment, since the movement locus to be used to calculate the predicted path is selected, it is possible to reduce a calculation load when the predicted path is calculated.

When the own vehicle is traveling following the other vehicle selected as a following target, if a plurality of vehicles are traveling in an adjacent lane and a path of the adjacent lane differs from a path of a lane in which the own vehicle is traveling, the predicted path should not be calculated on the basis of a movement locus of the vehicles traveling in the adjacent lane. In this regard, the movement locus of the other vehicle selected as a following target is selected as the movement locus to be used to calculate the predicted path. Thus, the predicted path can be calculated by using the movement locus of the other vehicle that is highly likely to take the same path as that of the own vehicle.

Second Embodiment

Figure 4:
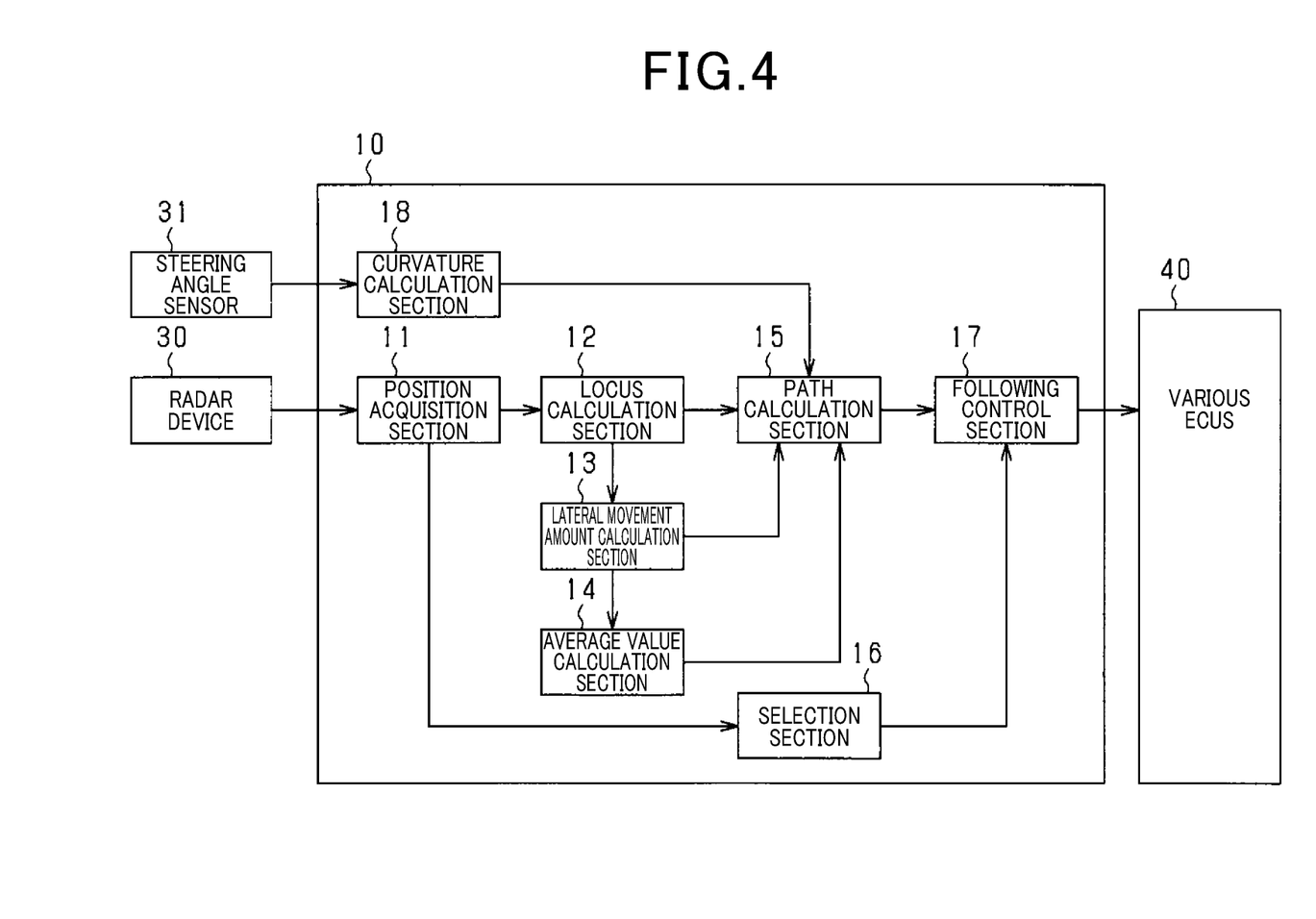
FIG. 4 is a view illustrating a configuration of a vehicle control apparatus according to a second embodiment.

The present embodiment differs from the first embodiment in a part of the configuration of the vehicle control apparatus 10. FIG. 4 illustrates the configuration of the vehicle control apparatus 10 according to the present embodiment. In the vehicle according to the present embodiment, a rotating shaft of the steering device is provided with a steering angle sensor 31 that detects a rotation angle of the rotating shaft as a steering angle, and the steering angle detected by the steering angle sensor 31 is inputted to the vehicle control apparatus 10.

A curvature calculation section 18 included in the vehicle control apparatus 10 calculates a curvature of a path of the own vehicle on the basis of the steering angle inputted from the steering angle sensor 31. Then, the curvature calculation section 18 determines that the own vehicle is traveling along a circular arc having the curvature.

Figure 5:
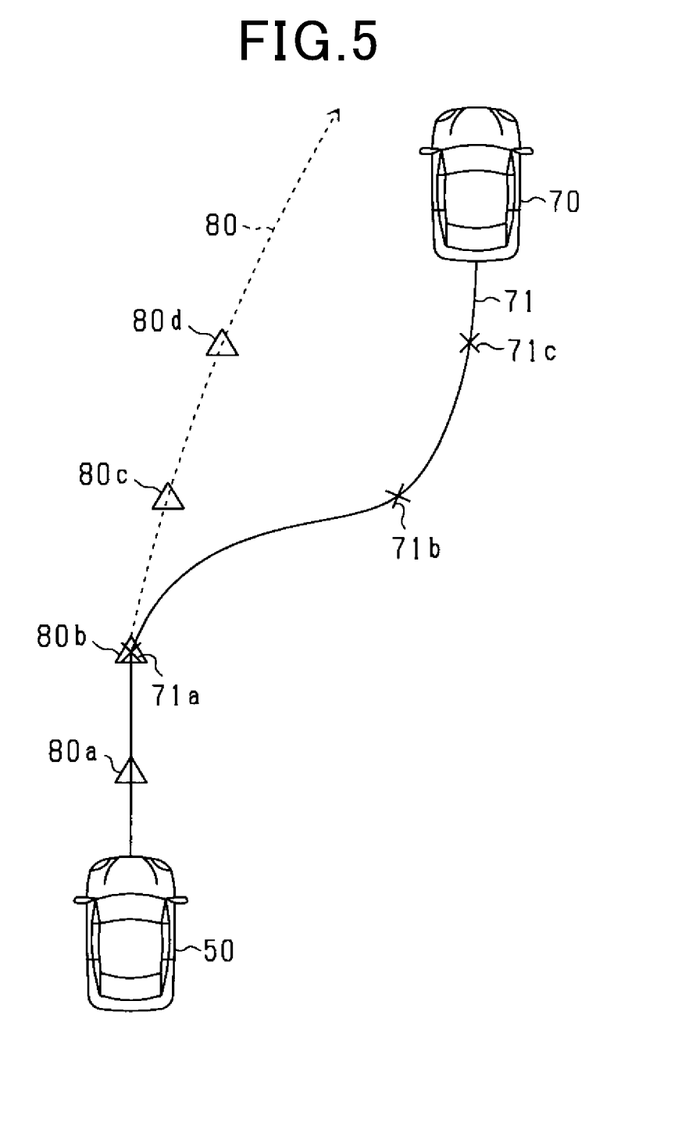
FIG. 5 is a view illustrating a process according to the second embodiment.

In FIG. 5, it is assumed that a movement locus 71 of an other vehicle 70 has been detected and the other vehicle 70 is traveling along an actual road shape. The movement locus 71 of the other vehicle 70 is assumed to have been detected only to a point 71a which is located a predetermined distance away from the own vehicle 50. In this case, when the predicted path of the own vehicle is calculated by using the movement locus 71 of the other vehicle, a predicted path from a current position of the own vehicle 50 to the point 71a may not be able to be calculated.

In the present embodiment, therefore, to a position located a predetermined distance away from the own vehicle 50, a circular arc 80 based on the curvature calculated by the curvature calculation section 18 is used as the predicted path of the own vehicle. Specifically, the circular arc 80 that passes through a point 80a and a point 80b illustrated in FIG. 5 is determined as the predicted path. In this case, as illustrated in FIG. 5, a point 80c and a point 80d on the circular arc 80 may deviate from points 71b and 71c on the movement locus 71 of the other vehicle. Specifically, when the predicted path of the own vehicle 50 is obtained by using the circular arc 80, a predicted path deviating from the actual road shape may be obtained.

Thus, to a certain point, i.e., the point 71a and the point 80b in FIG. 5, the predicted path is obtained by using the circular arc 80, and after that, the predicted path is obtained on the basis of the movement locus of the other vehicle 70. In this case, the predicted path to a point located a predetermined distance away from the own vehicle may be a predicted path based on the curvature calculated by the curvature calculation section 18, and the predicted path after the point may be calculated on the basis of the movement locus of the other vehicle 70. Alternatively, when the circular arc 80 has reached the movement locus 71 of the other vehicle 70, the predicted path may be obtained by using the movement locus 71.

Instead of the curvature, a radius of curvature may be used to obtain the predicted path of the own vehicle.

When the predicted path is calculated by using a curvature or a radius of curvature obtained from at least one of a yaw rate and a steering angle of the own vehicle, at a point farther from the own vehicle, the predicted path is less likely to be along the actual road shape. On the other hand, a steering operation performed by a driver of the own vehicle is performed so that a path of the own vehicle is along the road shape. Accordingly, a matching degree is high between a curvature and a radius of curvature within a predetermined distance away from the own vehicle and a curvature and a radius of curvature of the actual road shape. In the present embodiment, the predicted path within a predetermined distance away from the own vehicle is obtained by using the curvature or the radius of curvature. This can improve accuracy of the predicted path in the vicinity of the own vehicle.

When the own vehicle is traveling so as to catch up with an other vehicle, in some cases, a movement locus of the other vehicle does not reach the own vehicle, and thus the predicted path in the vicinity of the own vehicle cannot be calculated. In this regard, in the present embodiment, the predicted path in the vicinity of the own vehicle is obtained by using the curvature or the radius of curvature, and thus control using the predicted path can be performed at an earlier timing.

Third Embodiment

The vehicle control apparatus 10 according to the present embodiment has a general configuration in common with the general configuration illustrated in FIG. 1 of the first embodiment, but differs from the first embodiment in a part of the process performed by the path calculation section 15. Specifically, when the average value ΔYave of the lateral movement amounts ΔY is calculated, each of the lateral movement amounts ΔY is weighted, and the average value ΔYave is used to calculate the predicted path.

In addition to acquiring the lateral movement amount ΔY from the lateral movement amount calculation section 13, the average value calculation section 14 of the vehicle control apparatus 10 acquires, from the selection section 16, information identifying an other vehicle selected as a following control target. For a movement locus of the other vehicle selected as the following control target, the lateral movement amount ΔY is multiplied by a coefficient larger than a coefficient for other movement loci. Then, the average value ΔYave is calculated.

Once the average value ΔYave is obtained, the path calculation section 15 performs the exclusion process as in the first embodiment. Subsequently, the average value calculation section 14 acquires the result of the exclusion process, and obtains the average value ΔYave by using the lateral movement amounts ΔY of the movement loci that have not been excluded by the exclusion process. Then, the path calculation section 15 calculates the predicted path so that the amount of change in lateral position in each section in the longitudinal direction of the own vehicle is the average value ΔYave.

With the above configuration, in addition to the effects provided by the vehicle control apparatus 10 according to the first embodiment, the vehicle control apparatus 10 according to the present embodiment provides the following effect.

When the own vehicle is traveling following an other vehicle selected as a following target, if a plurality of vehicles are traveling in an adjacent lane and a path of the adjacent lane differs from a path of a lane in which the own vehicle is traveling, a movement locus of the other vehicle selected as the following target may be excluded from the calculation of the predicted path. In this regard, since a large weight is assigned to the movement locus of the other vehicle selected as the following target, the movement locus of the other vehicle selected as the following target is less likely to be excluded from the calculation of the predicted path.

Fourth Embodiment

Figure 6:
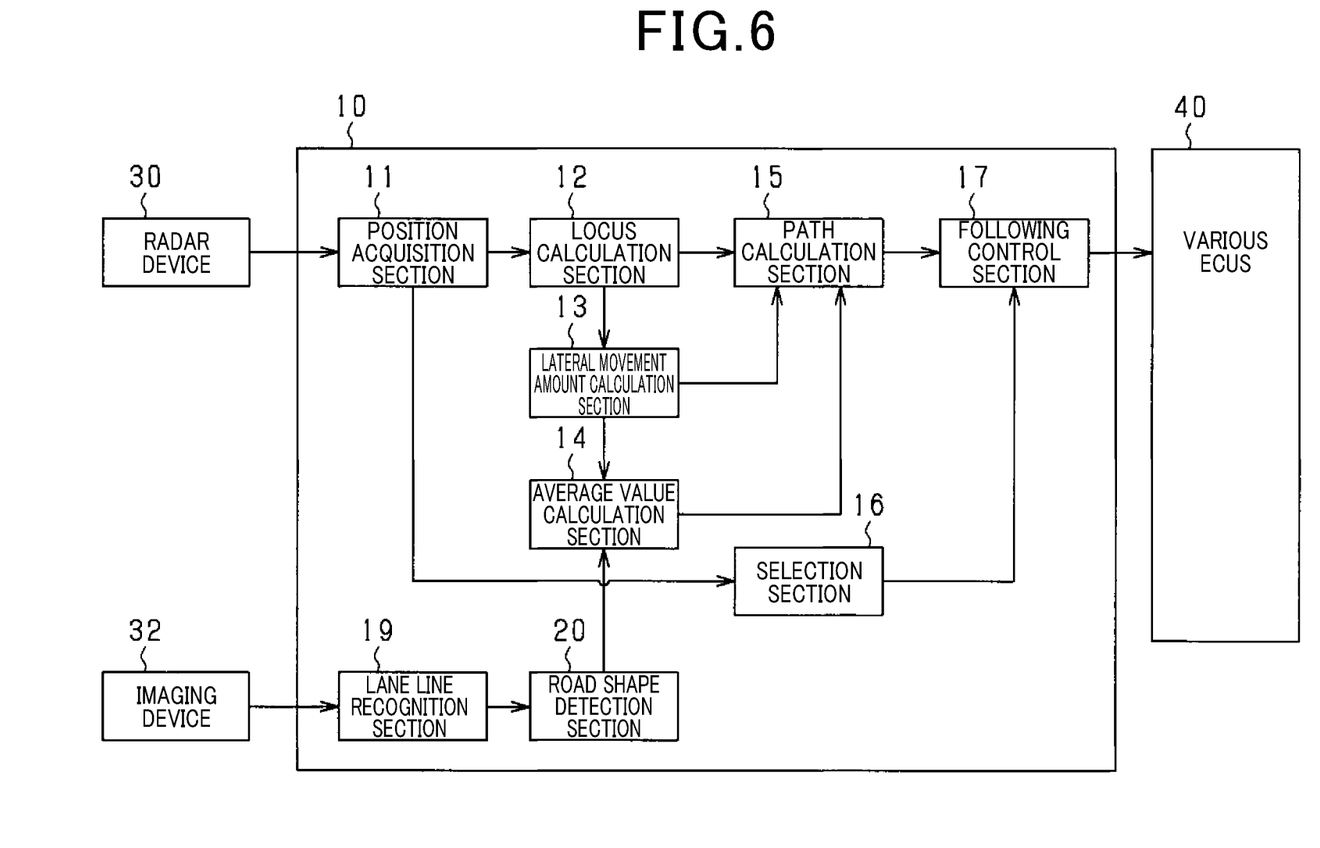
FIG. 6 is a view illustrating a configuration of a vehicle control apparatus according to a fourth embodiment.

The vehicle control apparatus 10 according to the present embodiment differs from the first embodiment in a part of the configuration. Specifically, as illustrated in FIG. 6, the vehicle including the vehicle control apparatus 10 is provided with an imaging device 32.

The imaging device 32 is a CCD camera, a CMOS image sensor, a near infrared camera, or the like. The imaging device 32 captures an image of a surrounding environment including a road on which the own vehicle is traveling, generates image data indicating the captured image, and sequentially outputs the image data to the vehicle control apparatus 10. The imaging device 32 is mounted at a predetermined height in the center in the width direction of the vehicle, and captures, from a bird's-eye view, an image of a region extending over a predetermined image capturing angle range toward an area ahead of the vehicle.

A lane line recognition section 19 of the vehicle control apparatus 10 recognizes a lane line on the road such as a white line. Specifically, the image data is inputted from the imaging device 32 to the lane line recognition section 19. From the image data, the lane line recognition section 19 extracts edge points to be candidates for a lane line on the basis of a rate of change in luminance in a horizontal direction of the image and the like. Then, the lane line recognition section 19 implements the Hough Transform with respect to the extracted edge points, recognizes the shape of the lane line by connecting characteristic points, and stores the shape of the lane line as lane line information.

The lane line information obtained by the lane line recognition section 19 is inputted to a road shape detection section 20. The road shape detection section 20 calculates a road shape on the basis of the lane line information. Specifically, on the basis of the recognized lane line information, the road shape detection section 20 obtains an approximate expression representing the shape of the lane line, so that the road shape is represented by the approximate expression.

When the average value calculation section 14 calculates the average value ΔYave by using the lateral movement amounts ΔY calculated by the lateral movement amount calculation section 13, the average value calculation section 14 also uses the road shape detected by the road shape detection section 20. Specifically, the average value calculation section 14 calculates a matching rate between the road shape detected by the road shape detection section 20 and a movement locus of each other vehicle. For a movement locus having a higher matching rate, the average value calculation section 14 sets a larger coefficient used for assignment of a weight. Specifically, the coefficient used for the assignment of a weight is set to be large for a lateral movement amount ΔY of a movement locus of an other vehicle that is traveling along the actual road shape. In other words, a lateral movement amount ΔY of a movement locus of a vehicle that has made a lane change or a path change is multiplied by a small coefficient.

With the above configuration, the vehicle control apparatus 10 according to the present embodiment provides the following effect.

As compared with a road shape obtained by using a locus of the other vehicle, a road shape obtained by using a travel lane line has a small deviation from the actual road shape. In the present embodiment, when the average value of the lateral movement amounts is obtained, a large weight is assigned to the movement locus having a shape close to the road shape. This prevents the movement locus having a shape close to the road shape from being excluded.

Fifth Embodiment

Similarly to the fourth embodiment, in the vehicle control apparatus 10 according to the present embodiment, the image data acquired from the imaging device 32 is processed by the lane line recognition section 19 and the road shape detection section 20.

The road shape detected by the road shape detection section 20 is inputted to the path calculation section 15. When the road shape has been detected by the road shape detection section 20, as the predicted path of the own vehicle, the path calculation section 15 uses the road shape instead of the movement locus of the other vehicle. Specifically, the path calculation section 15 calculates the predicted path so that the own vehicle can travel along the road shape detected by the road shape detection section 20. On the other hand, when no road shape can be detected by the road shape detection section 20, similarly to the first embodiment, the path calculation section 15 calculates the predicted path of the own vehicle by using the movement locus of the other vehicle.

The determination of whether the road shape has been detected by the road shape detection section 20 can be made on the basis of a length of a detected travel lane line. In this case, when the length of the detected travel lane line is longer than a predetermined first threshold, a road shape obtained on the basis of the travel lane line has high reliability. Thus, the predicted path is calculated by not using the movement locus of the other vehicle but using the road shape. On the other hand, when the length of the detected travel lane line is shorter than the first threshold, it may be determined that no travel lane line has been detected, and the predicted path may be calculated by using the movement locus of the other vehicle.

Alternatively, when the length of the detected travel lane line is shorter than the first threshold and is longer than a second threshold which is a value smaller than the first threshold, a road shape obtained on the basis of the travel lane line has low reliability. Thus, the predicted path may be calculated by using the road shape obtained on the basis of the travel lane line and the movement locus of the other vehicle. When the length of the detected travel lane line is shorter than the second threshold, it may be determined that no travel lane line has been detected, and the predicted path may be calculated by using the movement locus of the other vehicle.

With the above configuration, the vehicle control apparatus 10 according to the present embodiment provides the following effect.

An other vehicle may exhibit a behavior not along the road shape. Accordingly, when the predicted path of the own vehicle is calculated by using the movement locus of the other vehicle, the predicted path has lower accuracy than when the predicted path is calculated by using a travel lane line. In this regard, when a travel lane line has been detected, by calculating the predicted path using the travel lane line, accuracy of the predicted path can be improved.

Sixth Embodiment

Figure 7:
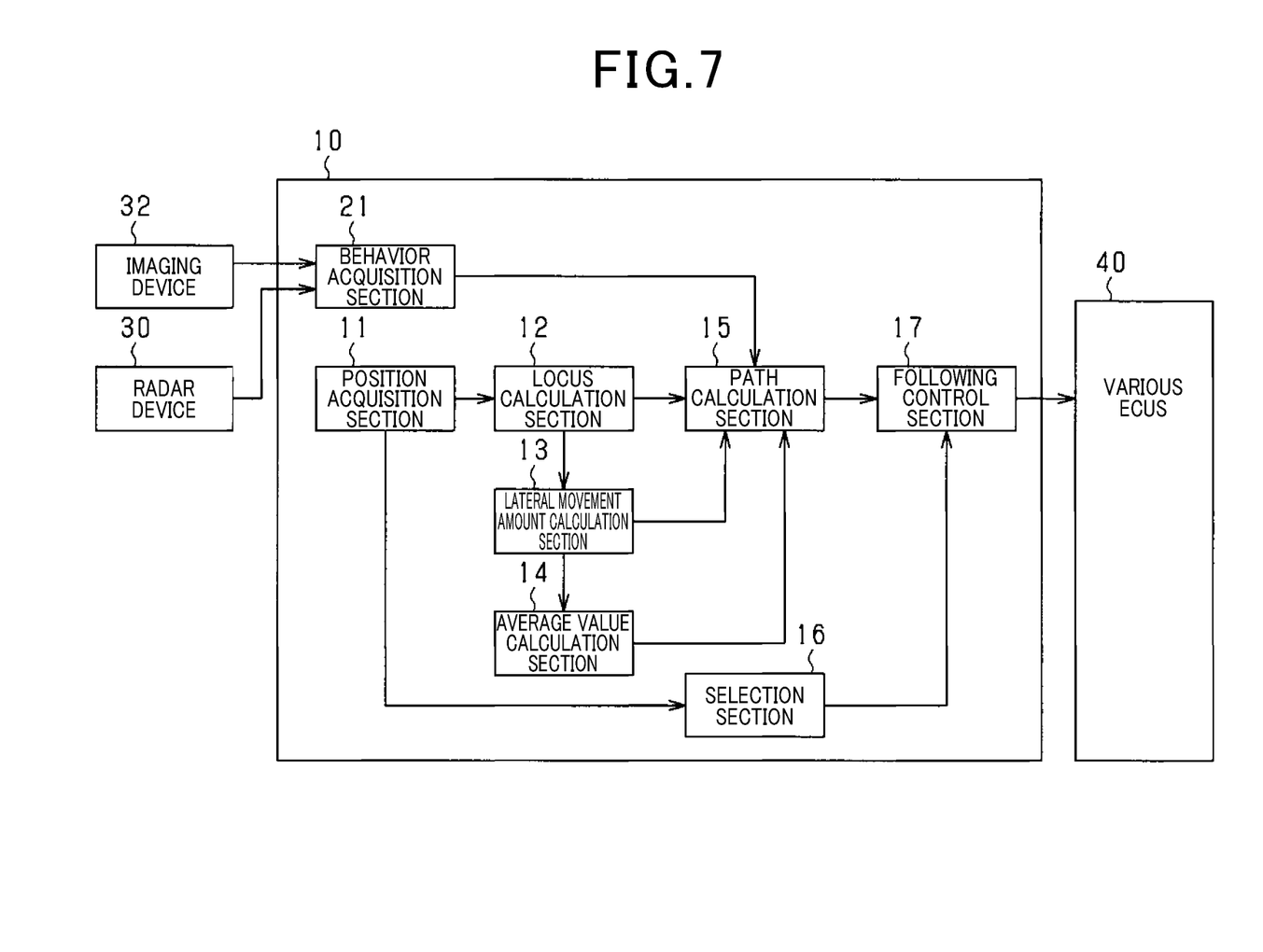
FIG. 7 is a view illustrating a configuration of a vehicle control apparatus according to a sixth embodiment.

The present embodiment differs from the first embodiment in a part of the configuration of the vehicle control apparatus 10, and accordingly, differs in a part of the process. As illustrated in FIG. 7, the vehicle control apparatus 10 according to the present embodiment includes a behavior acquisition section 21 that acquires a behavior of the other vehicle.

The behavior acquisition section 21 detects a behavior regarding a lane change or a path change of the other vehicle by using a position of the other vehicle acquired from the radar device 30 and an image of the other vehicle acquired from the imaging device 32. When the behavior of the other vehicle is regarding a lane change or a path change, the behavior acquisition section 21 inputs information identifying the other vehicle to the path calculation section 15.

The path calculation section 15 excludes a movement history of the other vehicle that exhibits the behavior regarding a lane change or a path change from the movement histories to be used to calculate the predicted path of the own vehicle. The process after the exclusion is equivalent to that of the first embodiment. Thus, a specific description is omitted.

The above-described behavior regarding a lane change or a path change may be acquired by detecting that a travel lane line has been blocked by an other vehicle. When an other vehicle makes a lane change or a path change, an image of a side surface of the other vehicle is captured. Thus, alternatively, when the imaging device 32 has captured an image of a side surface of an other vehicle, it may be determined that the behavior regarding a lane change or a path change has been acquired. When a vehicle makes a path change, a deceleration operation is very often performed. Thus, when the radar device 30 has detected a deceleration operation of an other vehicle, the behavior regarding a path change may be acquired.

When an other vehicle makes a lane change or a path change, an operation of flashing a turn signal is usually performed. Thus, when the imaging device 32 detects flashing of a turn signal of an other vehicle and the turn signal is flashing, it may be determined that the other vehicle is attempting to make a lane change or a path change, and a movement locus of the other vehicle may be excluded in advance.

With the above configuration, in addition to the effects provided by the vehicle control apparatus 10 according to the first embodiment, the vehicle control apparatus 10 according to the present embodiment provides the following effects.

When an other vehicle performs a lane change operation, the movement locus of the other vehicle is temporarily not along the road shape, and thus the movement locus should not be the predicted path. In this regard, in the present embodiment, a lane change of the other vehicle is detected, and the movement locus of the vehicle that has made a lane change is excluded from the candidates for the predicted path. This can prevent a situation where the movement locus of the other vehicle that is not traveling along the road shape is used as the predicted path.

When an other vehicle is flashing a turn signal, the other vehicle is highly likely to be attempting to make a lane change or a path change. Specifically, the movement locus of the other vehicle is highly likely to be inappropriate as the predicted path. In this regard, in the present embodiment, the movement locus that is highly likely to be inappropriate as the predicted path can be excluded in advance. This can prevent a situation where the movement locus of the other vehicle that is attempting to take a path different from that of the own vehicle is used as the predicted path.

When an other vehicle is decelerated, the other vehicle very often intends to make a right or left turn at an intersection or the like, or is attempting to enter a highway ramp. Specifically, the other vehicle is highly likely to be attempting to change a path from a road on which the own vehicle is traveling to another road. In this regard, in the present embodiment, when the other vehicle is decelerated, the start locus of the other vehicle is excluded from the candidates for the predicted path. This can prevent a situation where the movement locus of the other vehicle that is attempting to take a path different from that of the own vehicle is used as the predicted path.

Seventh Embodiment

Figure 8:
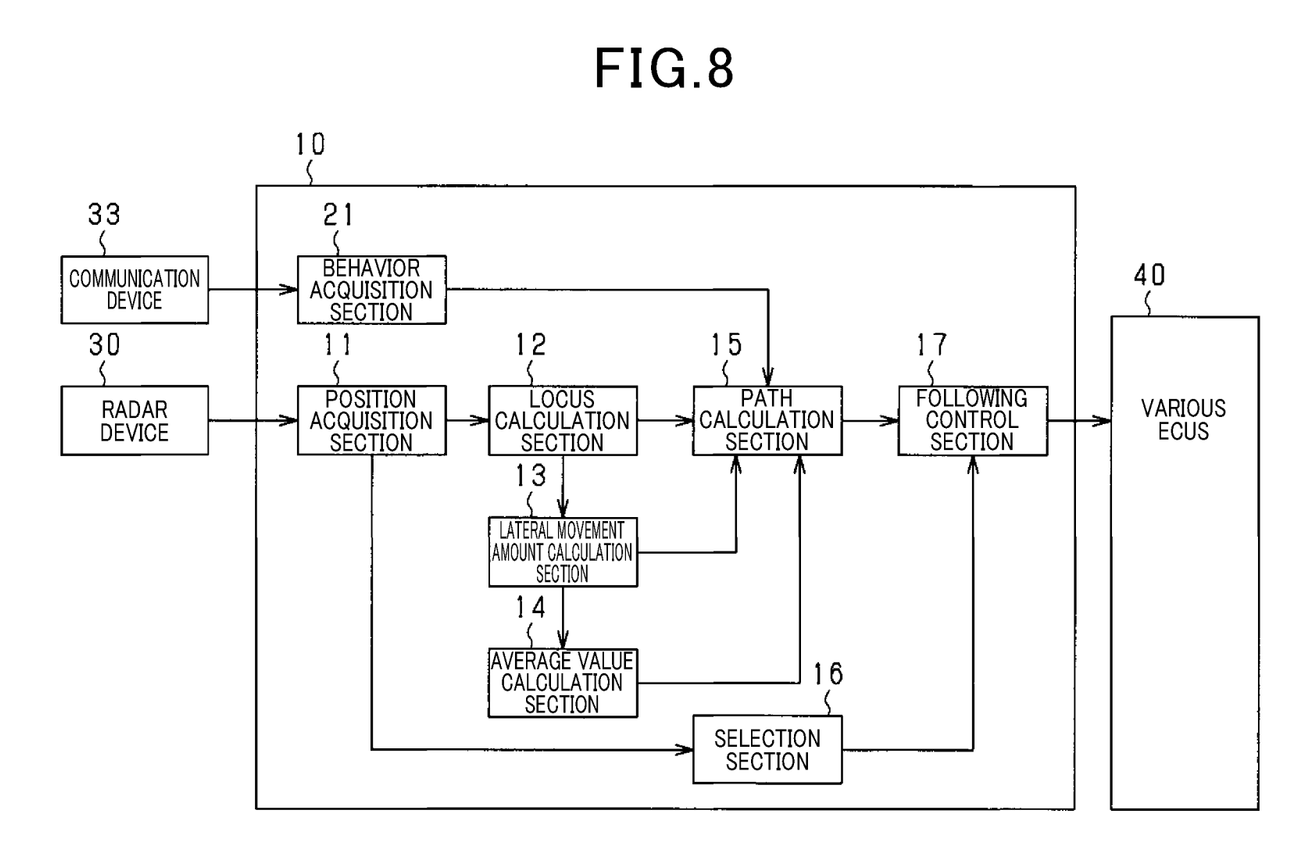
FIG. 8 is a view illustrating a configuration of a vehicle control apparatus according to a seventh embodiment.

The vehicle control apparatus 10 according to the present embodiment differs from the sixth embodiment in a part of the configuration. Specifically, as illustrated in FIG. 8, the vehicle is provided with a communication device 33 that communicates with an other vehicle. From the communication device 33, the behavior acquisition section 21 acquires information on a behavior of the other vehicle.

The information which the behavior acquisition section 21 acquires from the communication device 33 is information on the behavior regarding a lane change or a path change described in the sixth embodiment. Specifically, when a driver of the other vehicle has performed an operation of a turn signal, information indicating that the operation has been performed is transmitted from the other vehicle and is acquired by the communication device 33 of the own vehicle. When the driver of the other vehicle has performed a steering operation or a deceleration operation, information indicating that the operation has been performed is transmitted from the other vehicle and is acquired by the communication device 33 of the own vehicle.

When the behavior acquisition section 21 acquires the above-mentioned signal, a process equivalent to that of the sixth embodiment is performed. Thus, a specific description is omitted.

With the above configuration, in addition to the effects provided by the vehicle control apparatus 10 according to the sixth embodiment, the vehicle control apparatus 10 according to the present embodiment provides the following effect.

When a behavior of an other vehicle is detected, a certain amount of time may be required from when a driver of the other vehicle has performed a vehicle operation until when a behavior based on the operation is detected by the own vehicle. In this regard, as in the present embodiment, by acquiring, through communication, the operation performed by the driver of the other vehicle, it is possible to acquire the behavior of the other vehicle at an earlier timing. Thus, the movement locus of the other vehicle that is unlikely to travel along the road shape can be excluded at an earlier timing from the candidates for the predicted path.

MODIFIED EXAMPLES

In the embodiments, the lateral movement amount $\Delta Y$ of each of the movement loci is obtained by the lateral movement amount calculation section 13, and then the average value $\Delta Y_{ave}$ of the lateral movement amounts $\Delta Y$ is calculated. In this regard, an average value of lateral positions of the movement loci may be obtained, and then the lateral movement amount of the average value may be calculated. Also in such a case, effects equivalent to those of the first embodiment can be obtained.

When the predicted path of the own vehicle is calculated, a movement locus of an other vehicle that has a relative speed to the own vehicle lower than a predetermined value may be preferentially selected as the movement locus to be used to calculate the predicted path. The other vehicle having a low relative speed to the own vehicle is highly likely to have been traveling for a long time in the same direction as the own vehicle ahead of the own vehicle in its traveling direction. Thus, the movement locus of the other vehicle is appropriate to calculate the predicted path. Furthermore, an other vehicle having a lower relative speed to the own vehicle has higher accuracy for position detection. Accordingly, the movement locus of such an other vehicle is appropriate to calculate the predicted path. Thus, by calculating the predicted path using the movement locus of the other vehicle having a relative speed to the own vehicle lower than the predetermined value, the predicted path can be more accurately calculated.

When the predicted path of the own vehicle is calculated, a movement locus for which the number of detections of a position by the position acquisition section 11 is larger than the predetermined number may be preferentially selected as the movement locus to be used to calculate the predicted path. An other vehicle for which the number of detections of a position is smaller has a movement locus with lower accuracy. Thus, by calculating the predicted path using the movement locus for which the number of detections of a position is larger than the predetermined number, accuracy of the predicted path can be improved.

In the sixth and seventh embodiments, the behavior indicating at least one of a lane change and a path change of the other vehicle is not limited to the behavior shown in the embodiments, and one of the lane change and the path change may be detected on the basis of a different behavior.

The present disclosure has been described on the basis of the embodiments, but it is understood that the present disclosure is not limited to the embodiments or the structures. The present disclosure includes various modified examples and modifications within an equivalent range. In addition, the category or range of thought of the present disclosure includes various combinations and forms, and other combinations and forms including only one element, one or more elements, or one or less elements of those.

The invention claimed is:

1. A vehicle control apparatus for controlling traveling of an own vehicle on the basis of a predicted path which is a future travel path of the own vehicle, comprising:

a position acquisition section that acquires a position of an other vehicle that is present ahead of the own vehicle in its traveling direction;

a locus calculation section that calculates a movement locus, which is a past path of the other vehicle, by using the position of the other vehicle acquired by the position acquisition section;

a lateral movement amount calculation section that calculates a lateral movement amount of the movement locus in a predetermined range in the traveling direction of the own vehicle, the lateral movement amount being an amount of change in position in a lateral direction which is a direction intersecting the traveling direction;

an average value calculation section that calculates an average value of a plurality of lateral movement amounts; and a path calculation section that:
  determines a difference between the average value of the plurality of lateral movement amounts and a particular lateral movement amount of a particular movement locus of the other vehicle;
  determines that the difference between the average value and the particular lateral movement amount is larger than a predetermined value;
removes, from a plurality of movement loci, the particular movement locus in response to determining that the difference between the particular lateral movement amount and the average value is larger than the predetermined value: and
  calculates the predicted path on the basis of one or more remaining movement loci after removal of the particular movement locus from the plurality of movement loci.

2. The vehicle control apparatus according to claim 1, further comprising a road shape detection section that detects at least one of a curvature and a radius of curvature of a path of the own vehicle on the basis of at least one of a yaw rate and a steering angle of the own vehicle, wherein
  the path calculation section calculates the predicted path within a predetermined distance from the own vehicle on the basis of at least one of the curvature and the radius of curvature.

3. The vehicle control apparatus according to claim 1, further comprising a selection section that selects an other vehicle as a following target from a plurality of other vehicles, wherein
  when calculating the average value, the average value calculation section assigns a weight, and
  the average value calculation section assigns a large weight to a movement locus of the other vehicle selected as the following target.

4. The vehicle control apparatus according to claim 1, further comprising a road shape detection section that detects a shape of a road on which the own vehicle travels, on the basis of a detection result on at least one of a travel lane line drawn on the road and a structure provided on a roadside, wherein
  when calculating the average value, the average value calculation section assigns a weight, and
  the average value calculation section assigns a larger weight to a movement locus having a shape closer to the shape of the road.

5. The vehicle control apparatus according to claim 1, further comprising a road shape detection section that detects a shape of a road on which the own vehicle travels, on the basis of a detection result on at least one of a travel lane line drawn on the road and a structure provided on a roadside, wherein
  when the shape of the road is detected, the path calculation section calculates the predicted path on the basis of the shape of the road.

6. The vehicle control apparatus according to claim 1 wherein from the one or more remaining movement loci, the path calculation section selects a movement locus to be used to calculate the predicted path.

7. The vehicle control apparatus according to claim 6, further comprising a selection section that selects an other vehicle as a following target from a plurality of other vehicles, wherein
  the path calculation section causes a movement locus of the other vehicle selected as the following target to be more likely to be selected as a movement locus to be used to calculate the predicted path.

8. The vehicle control apparatus according to claim 6, wherein the path calculation section causes a movement locus of an other vehicle having a lateral position closest to the own vehicle to be more likely to be selected as a movement locus to be used to calculate the predicted path, the lateral position being a position in a direction orthogonal to the traveling direction of the own vehicle.

9. The vehicle control apparatus according to claim 6, wherein the path calculation section causes a movement locus of an other vehicle having a relative speed to the own vehicle lower than a predetermined value to be more likely to be selected as a movement locus to be used to calculate the predicted path.

10. The vehicle control apparatus according to claim 6, wherein the path calculation section causes a movement locus for which the number of acquisitions of a position by the position acquisition section is larger than a predetermined number to be more likely to be selected as a movement locus to be used to calculate the predicted path.

11. The vehicle control apparatus according to claim 1, further comprising a behavior acquisition section that acquires a lane change operation of the other vehicle as a behavior, wherein
  when a lane change of the other vehicle is detected, the path calculation section excludes the movement locus of the other vehicle.

12. The vehicle control apparatus according to claim 11, wherein
  the own vehicle is provided with a communication device that acquires a behavior of the other vehicle from the other vehicle through communication, and
  the behavior acquisition section acquires the behavior from the communication device.

13. The vehicle control apparatus according to claim 1, further comprising a behavior acquisition section that acquires a deceleration operation of the other vehicle as a behavior, wherein
  when a deceleration of the other vehicle is larger than a predetermined value, the path calculation section excludes the movement locus of the other vehicle.

* * * * *